US005213702A

United States Patent [19]

Nishida et al.

[11] Patent Number: 5,213,702

[45] Date of Patent: May 25, 1993

[54] MEDIA AGITATING MILL AND METHOD FOR MILLING CERAMIC POWDER

[75] Inventors: Masamitsu Nishida, Osaka; Hamae Ando, Neyagawa; Koichi Kugimiya, Toyonaka, all of Japan

[73] Assignee: Matsushita Electric Industrial Co., Ltd., Osaka, Japan

[21] Appl. No.: 944,731

[22] Filed: Sep. 14, 1992

Related U.S. Application Data

[60] Continuation of Ser. No. 748,875, Aug. 23, 1991, abandoned, which is a division of Ser. No. 381,369, Jul. 18, 1989, Pat. No. 5,065,946.

[30] Foreign Application Priority Data

| | | | |
|---|---|---|---|
| Jul. 21, 1988 | [JP] | Japan | 63-182337 |
| Sep. 1, 1988 | [JP] | Japan | 63-219044 |
| Oct. 4, 1988 | [JP] | Japan | 63-250209 |

[51] Int. Cl.[5] .......... C04B 35/00

[52] U.S. Cl. .......... 252/62.9; 501/134

[58] Field of Search .......... 252/62.9; 501/134

[56] References Cited

U.S. PATENT DOCUMENTS

| | | | |
|---|---|---|---|
| 3,311,310 | 3/1967 | Engel et al. | 241/172 X |
| 3,337,140 | 8/1967 | Wahl | 241/172 |
| 3,682,399 | 5/1972 | Kaspar et al. | 241/50 |
| 3,927,837 | 12/1975 | Clark | 241/46.11 |
| 4,513,917 | 4/1985 | Szkaradek | 241/46.11 |
| 4,915,307 | 4/1990 | Klimaschka et al. | 241/65 |

FOREIGN PATENT DOCUMENTS

| | | |
|---|---|---|
| 0312932 | 4/1989 | European Pat. Off. . |
| 63-5139 | 1/1988 | Japan . |
| 1217155 | 12/1970 | United Kingdom . |

OTHER PUBLICATIONS

"Zairyo (materials)", Tanaka et al., vol. 35, pp. 54–58.

"Powder—Theory and Application", revised second edition, published 1979, by Maruzen Co., Ltd., Japan.

*Primary Examiner*—Mark L. Bell
*Assistant Examiner*—Chris Gallo
*Attorney, Agent, or Firm*—Stevens, Davis, Miller & Mosher

[57] ABSTRACT

Provided is a method for milling ceramic powder which comprises wet-milling at least one ceramic powder by a media agitating mill wherein the volume of liquid is 4 times or less the net-volume of the ceramic powder. A dispersing agent is added and milling is carried out using grinding media of 1 mm, or less, in diameter. Further, a media agitating mill used for the above method is provided which comprises a milling chamber, grinding media and an agitator wherein the peripheral speed of the agitator is 10 m/s or more, the grinding media have a diameter of 1 mm or less and packing fraction of the grinding media is 65–85 vol %. A method for making a sintered body from fine powder produced by the above milling method is also disclosed.

3 Claims, No Drawings

MEDIA AGITATING MILL AND METHOD FOR MILLING CERAMIC POWDER

This application is a continuation of application Ser. No. 07/748,875, filed Aug. 23, 1991, now abandoned, which in turn is a division of application Ser. No. 07/381,369, filed Jul. 18, 1989, now U.S. Pat. No. 5,065,946.

BACKGROUND OF THE INVENTION

1. Field of the Invention

The present invention relates to a media agitating mill for performing grinding, mixing, dispersing, homogenizing and the similar actions.

Furthermore, the present invention relates to a method for wet milling ceramic powders into fine particles, especially to submicron particles or finer particles by a media agitating mill.

The "milling" used herein includes preferential grinding which comprises carrying out grinding and mixing simultaneously.

Moreover, the present invention also relates to a fine powder and a method for producing the same and to a method for producing a sintered body using the fine powder, especially to a fine powder of 0.6 μm or less in mean particle size and a method for producing it and a method for producing a sintered body using this fine powder.

2. Description of Related Art

Hitherto, for milling ceramic powders to fine powders, there has been a method which comprises dispersing the ceramic powders in a liquid such as water, ethanol and trichloroethane in a volume of about 10 times or more that of the ceramic powders and agitating the dispersion together with grinding media such as agate, zirconia ceramic, and alumina ceramic, to thereby perform milling of the ceramic powders. It has been reported that in this method, when grinding media of small diameter (in the order of mm) are used, milling time can be shortened as compared with when grinding media of larger size are used. (Tanaka et al, "Zairyo (materials)", Vol. 35, pages 54–58). Recently, media agitating mill which agitates grinding media and powder at a high speed has been noticed as a mill for ceramic powders.

Conventional media agitating mills have a structure comprising at least a milling chamber, grinding media and an agitator and inner face of the milling chamber is made of metals such as stainless steel, ceramics or resins.

It has been said that in order to produce a homogenous and high density sintered body by ordinary firing, it is essential that the particle size of raw material powder is less than submicron. Recently, a fine powder prepared by a solution method such as a coprecipitation method or alkoxide method has been noticed as raw material powder for obtaining a homogeneous and high density sintered body by firing at a low temperature. Furthermore, as a method for obtaining a fine powder by a milling method, there is a method which uses a media agitating mill which agitates grinding media and powder at a high speed by an agitator.

The conventional methods need a long time for milling ceramic powders to fine powders, especially of a particle size of submicron. As mentioned in the above cited literature, in order to mill a calcined powder of $BaTiO_3$ to a particle size of less than about 0.6 μm, 100 hours or more is required even if grinding media of 2 mm are used.

The conventional media agitating mills and methods for milling ceramic powders using this mills require a long time for milling ceramic powders to fine powders, especially to a particle size of submicron. Further, in this case, grinding media or an agitator are considerably worn and the components thereof are incorporated into the ceramic powders to cause deterioration and scattering of properties. The milling time can be shortened by increasing the number of revolution or peripheral speed of agitator to increase a milling speed. However, the above-mentioned conventional milling chambers have various defects and the milling speed cannot be increased so much. That is, in case the milling chamber is made of metals such as stainless steel or chromium plating, the milling chamber is considerably worn and the components of the chamber are incorporated into ceramic powders, resulting in deterioration or scattering of the properties. If the milling chamber is made of ceramic such as alumina and zirconia, wear is relatively less than that of the metallic chamber, but is still serious and causes incorporation of components of the chamber into ceramic powders, resulting in deterioration and scattering of the properties. Besides, they are relatively expensive. When the chamber is made of resins such as polyethylene and polyurethane, since they are low in thermal conductivity, heat is considerably generated when a milling speed is increased and thus, the milling speed cannot be sufficiently increased.

According to the conventional solution methods such as a coprecipitation method and alkoxide method, there is obtained a homogeneous fine powder having a particle diameter of from submicron to several nanometers and uniform in particle diameter, but the resulting powder is generally poor in dispersibility. Therefore, a molded body of high density cannot be obtained and hence it is difficult to obtain a homogeneous sintered body because of abnormal growth of particles. Moreover, according to these methods, the composition of the resulting powder is not necessarily the same as that of raw material. Besides, the resulting powder is high in cost.

On the other hand, there is a ball mill method as a milling method for obtaining fine powders and this method has been widely used as a method excellent in mass-producibility. However, this method requires much time for obtaining a powder of submicron in particle size. In addition, a powder prepared by the conventional milling method is inferior in dispersibility and a molded body or sintered body of high density is difficult to obtain.

SUMMARY OF THE INVENTION

The primary object of the present invention is to provide a milling method free from the above-mentioned problems in the conventional techniques.

Another object of the present invention is to provide a media agitating mill for practising the above-mentioned method.

Still another object of the present invention is to provide a ceramic fine powder of submicron.

DETAILED DESCRIPTION OF PREFERRED EMBODIMENTS

According to the present invention, there is provided a method for wet-milling at least one ceramic powder by a media agitating mill using grinding media wherein a volume of liquid is 4 times or less the net-volume of the ceramic powder, a dispersing agent is added and the grinding media have a diameter of 1 mm or less.

In the media agitating mill provided with a milling chamber, grinding media and an agitator, peripheral speed of the agitator is 10 m/s or higher, diameter of the grinding media is 1 mm or less and the packing fraction of the grinding media is 65–85 vol %.

In the media agitating mill provided with a milling chamber, the grinding media and an agitator, the agitator is made of ceramics mainly composed of zirconia and the grinding media comprises ceramics mainly composed of zirconia, zircon or titania.

Furthermore, the present invention provides a media agitating mill comprising at least a milling chamber, grinding media and an agitator, characterized in that at least the inner face of the milling chamber comprises a composite material of a powder of at least one of ceramics and metals and an organic polymer material.

Furthermore, there is provided a method for milling at least one ceramic powder by media agitating mill, characterized by carrying out the milling in a milling chamber at least the inner face of which is made of a composite of at least one powder of ceramics or a metal and an organic polymer material.

The present invention provides a fine powder, characterized in that the average particle diameter of the powder is 0.6 μm or less and the proportion of particles having a size of twice or more the mean particle diameter is 7% by weight or more in particle size distribution. In detail, the fine powder is characterized in that the mean particle diameter of the powder is 0.2 μm or less and the proportion of particles having a size of twice or more the mean particle diameter is 7% by weight or more in particle size distribution. In more detail, the fine powder is characterized in that the material of the powder is a ceramic material.

Furthermore, the present invention provides a method for producing a fine powder by a media agitating mill, characterized in that diameter of grinding media is 1 mm or less and a milling medium liquid is the same as the solvent used for wet molding of the powder. In detail, the method is characterized in that volume of the milling medium liquid is 4 times or more the net-volume of the powder, a dispersing agent is added and the milling is carried out using grinding media having a diameter of 0.6 mm or less. In more detail, the method is characterized in that the material of the powder is a ceramic and in further detail, is characterized in that the powder is a piezoelectric ceramic.

Further, the present invention provides a method for producing a sintered body which comprises at least the steps of milling a powder, molding the powder and firing the molded body, characterized in that at least the milling step comprises wet-milling by a media agitating mill and subsequent to this step, the powder dispersed in a milling medium liquid is subjected to wet-molding without drying step. In detail, this method is characterized in that the milling medium liquid is an organic solvent and the sintered body is a ceramic. In more detail, this method is characterized in that the milling by a media agitating mill is carried out by the milling method where the diameter of the grinding media is 0.6 mm or less, the milling medium liquid is an organic solvent, volume of the milling medium liquid is 4 times or less the net-volume of the powder and a dispersing agent is added and the sintered body is a ceramic. In further detail, this method is characterized in that the sintered body is a piezoelectric ceramic.

As explained above, the ceramic powder can be milled to submicron particles in a very short time by limiting an amount of liquid to 4 times or less the net-volume of the ceramic powder, using a dispersing agent and milling by a media agitating mill using grinding media of 1 mm or less in particle size. Since wear of grinding media is extremely small, the amount of the media incorporated into the ceramic powder is also very small. Slurry is also excellent in dispersibility and effect of mixing is high. That is, in case of preferential grinding of two or more kinds of ceramic powders, the effect of homogeneous mixing is obtained together with the effect of milling to fine powder. According to the milling method of the present invention, the amount of liquid used is extremely small and hence there is the effect that separation of ceramic powder occurs with difficulty during slurry drying in preferential grinding of two or more kinds of ceramic powders. Since the amount of liquid used is extremely small in the present method, the volume of slurry is ½–¼ of volume in conventional method for the same amount of ceramic powder. Therefore, processing ability of several times that of conventional milling method by mill of same capacity can be obtained.

According to the present invention, grinding media of zirconia, titania or zircon are used and an agitator made of zirconia is used. Therefore, incorporation of these components due to wear is less and the components incorporated due to wear are mainly zirconia and titania and in case of mixing and milling of ceramic powders containing titanium or zirconium element, effect of change in composition caused by incorporation of the worn components can be ignored as compared with the case where grinding media and an agitator made of other materials are used.

According to the present invention, a milling speed can be increased and besides wear of grinding media can be markedly reduced by carrying out milling with a specific packing fraction of grinding media and a specific peripheral speed of agitator. Further, ceramic powder can be milled to fine particles in a short time and can be very easily milled to particle diameter of submicron or less.

At least the inner face of milling chamber of the media agitating mill of the present invention is made of a composite of a powder of at least one of a ceramic and metal and organic polymer material and hence incorporation of metallic components due to wear is a little and heat dissipation can be increased because of high thermal conductivity. As a result, milling speed can be much increased, ceramic powder can be milled to fine powder in a very short time and wear of grinding media is also reduced.

The fine powder of the present invention is characterized in that it has a small mean particle diameter of 0.6 μm or less, it has a proper particle size distribution and it is good in dispersibility and molded body prepared from this fine powder has a high density and excellent sinterability and can be fired into a sintered body of a high density at a low temperature. The method for producing a fine powder using the media agitating mill of the present invention is a method for producing the fine powder having the above characteristics and can produce a fine powder of a high purity in a very short time. According to the method for producing the sintered body of the present invention, the sintered body of high density can be produced by wet-molding a dispersion of the fine powder prepared by the above method in a milling medium liquid by doctor blade method, etc. and then firing the molded body.

Examples of the present invention are shown below.

EXAMPLE 1

$Pb_3O_4$, ZnO, $SnO_2$, $Nb_2O_5$, $TiO_2$, and $ZrO_2$ (mean particle diameter of these powders was 2.3 μm) were used as ceramic powders. These were weighed for the compositional ratio represented by $Pb(Zn_{1/3}Nb_{2/3})_{0.09}(Sn_{1/3}Nb_{2/3})_{0.09}Ti_{0.42}Zr_{0.40}O_3$. Pure water in a volume of 0.75–7 times the net-volume of these ceramic powders, a polycarboxylic acid type dispersing agent (Seramo D134 of Daiichi Kogyo Seiyaku Co., Ltd.) in an amount of 0–2 wt % of the ceramic powders and these ceramic powders (totally about 80 ml) was charged in a flowing tube type media agitating mill of 50 ml in internal volume (mortor mill of Eiger Engineering Limited; 5000 rpm, peripheral speed of agitator 10 m/sec, grinding media; zirconia 132 g) and preferential grinding was carried out for 60 minutes. A given amount of the resulting slurry was taken in a test tube and centrifuged to sediment ceramic powders and sedimentation volume thereof was measured. Further, particle diameter of the obtained powder was measured by an apparatus for measuring particle size distribution by sedimentation method (Sedigraph 500 of Shimadzu Seisakusho Ltd.). The sedimentation volume is a standard for dispersibility of powder and smaller sedimentation volume means better dispersion and greater sedimentation volume means that particles agglomerate to form secondary particles ("Powder—Theory and Application", revised second edition, published in 1979 from Maruzen Co., Ltd.). The sedimentation volume was shown by volume (cc) per 1 cc of net-volume of ceramic powder. The results are shown in Table 1. Mean particle diameter was 50% particle diameter of powder. Wear of grinding media was examined by measuring weight of grinding media before and after use. In Table 1, the wear of grinding media is shown by precentage for the weight of ceramic powder.

TABLE 1

| No. | Amount of water (time) | Amount of dispersing agent (%) | Diameter of grinding media (mm) | Sedimentation volume (cc/cc) | Mean particle diameter (μm) | Wear amount of grinding media (wt %) |
|---|---|---|---|---|---|---|
| 1* | 7 | no | 0.4 | 2.90 | 0.25 | 0.042 |
| 2* | 4 | no | 0.4 | No flowability | | — |
| 3 | 4 | 1.0 | 0.4 | 1.69 | 0.24 | 0.038 |
| 4 | 2 | 1.5 | 0.4 | 1.55 | 0.25 | 0.042 |
| 5* | 1.5 | " | 2 | 1.64 | 0.62 | 0.415 |
| 6 | " | " | 1 | 1.67 | 0.29 | 0.021 |
| 7 | " | " | 0.6 | 1.62 | 0.22 | 0.026 |
| 8 | " | " | 0.4 | 1.65 | 0.16 | 0.035 |
| 9 | " | " | 0.3 | 1.69 | 0.13 | 0.039 |
| 10 | 1 | " | 1 | 1.66 | 0.30 | 0.024 |
| 11 | 0.75 | 2.0 | " | 1.71 | 0.33 | 0.023 |

*Comparative example

EXAMPLE 2

The slurry No. 7 of Example 1 was dried and charged in a crucible made of alumina ceramic and calcined at 850° C. for 2 hours to form nearly a single phase. This was granulated by an agitating grinder (Ishikawa Kojyo Co.). Totally 80 ml of a mixture comprising this powder, pure water in an amount of 0.75–8 times the net-volume of powder (mean particle diameter: 1.05 μm) and a poly-carboxylic acid type dispersant (Ceramo D134 of Daiichi Seiyaku Kogyo K.K.) in an amount of 0–2 wt % of the ceramic powder (in terms of solid content) was put in the media agitating mill used in Example 1 and milled for 60 minutes. Then, in the same manner as in Example 1, sedimentation volume, mean particle diameter and wear of grinding media were measured. The results are shown in Table 2.

TABLE 2

| No. | Amount of water (time) | Amount of dispersing agent (%) | Diameter of grinding media (mm) | Sedimentation volume (cc/cc) | Mean particle diameter (μm) | Wear amount of grinding media (wt %) |
|---|---|---|---|---|---|---|
| 12* | 8 | no | 0.4 | 2.73 | 0.23 | 0.024 |
| 13* | 4 | no | " | No flowability | | — |
| 14 | 4 | 1.0 | " | 1.70 | 0.19 | 0.022 |
| 15 | 2 | 1.5 | " | 1.63 | 0.21 | 0.020 |
| 16* | 1.5 | " | 2 | 1.66 | 0.56 | 0.367 |
| 17 | " | " | 1 | 1.68 | 0.27 | 0.018 |
| 18 | " | " | 0.6 | 1.71 | 0.20 | 0.015 |
| 19 | " | " | 0.4 | 1.68 | 0.15 | 0.017 |
| 20 | " | " | 0.3 | 1.71 | 0.11 | 0.025 |
| 21 | 1 | " | 1 | 1.67 | 0.33 | 0.023 |
| 22 | 0.75 | 2.0 | 1 | 1.74 | 0.35 | 0.025 |

*Comparative example

As is clear from the above Examples, ceramic powder milled by the present method, namely, by a media agitating mill using water in an amount of 4 times or less the amount of ceramic powder, and a dispersing agent and grinding media of 1 mm or less in diameter is extremely small in sedimentation volume and besides is small in mean particle diameter. Mere use of grinding media having a small diameter can reduce the mean particle diameter, but in this case sedimentation volume of powder is small and dispersibility of the powder is poor. Mere decrease of amount of water results in loss of flowability and milling cannot utterly be performed. Wear of grinding media is very large in case of 2 mm in diameter while is sharply reduced in case of 1 mm or less. Thus, grinding media of 1 mm or less and as small as possible in diameter are suitable for milling. When diameter of grinding media is 0.6 mm or less, effect of milling is further increased. In order to effectively carry out the milling, it is preferred to make previously the ceramic powder sufficiently smaller than grinding media. The necessary minimum amount of water is such that slurry has flowability. If amount of water is less than 0.75 time, many of the slurries decrease in flowability. Effective amount of dispersing agent is 0.5-2 wt % of the weight of ceramic powder (in terms of solid content).

The scope of the present invention is not limited to the Examples and kind of grinding media is not limited to the zirconia used in these Examples, but any other grinding media such as alumina, titania, silicon carbide, silicon nitride, and glass can be used. Moreover, ceramic powder may be any other powders. Further, grinding media and agitator made of other materials are used.

EXAMPLE 3

About 60 ml of the same slurry as in Example 1 was put in a media agitating mill of 40 ml in inner volume (M-50 mortar mill of Eiger Enginnering Ltd.; lining of agitating chamber: polyurethane; revolution number: 5000 rpm; peripheral speed of agitator: 10 m/sec, packing fraction of grinding media: 70%) and subjected to preferential grinding for 30 minutes. Outline of construction of the media agitating mill used is shown in Japanese Patent Kokai (Laid-Open) No. 63-5139. The agitators used were made of super hard chromium steel, alumina ceramics, zirconia ceramics (partially stabilized zirconia containing yttria), or polypropylene. Grinding media used were made of alumina ceramics, zirconia ceramics (partially stabilized zirconia containing yttria), titania ceramics or zircon. Sedimentation volume, mean particle diameter and wear amount are shown in Table 3.

TABLE 3

| No. | Amount of water (time) | Amount of dispersing agent (%) | Material of agitator | Material of grinding media | Diameter of grinding media (mm) | Sedimentation volume (cc/cc) | Diameter of particle (μm) | Wear amount (wt %) Agitator | Grinding media |
|---|---|---|---|---|---|---|---|---|---|
| 23* | 7 | no | Zirconia | Zirconia | 0.6 | 2.96 | 0.27 | 0.012 | 0.025 |
| 24* | 4 | " | " | " | " | No flowability | | | |
| 25 | 4 | 1.0 | " | " | " | 1.72 | 0.26 | 0.003 | 0.019 |
| 26 | 2 | " | " | " | " | 1.66 | 0.21 | 0.002 | 0.021 |
| 27* | 1.5 | 1.5 | " | " | 2 | 1.61 | 0.62 | 0.135 | 0.598 |
| 28 | " | " | " | " | 1 | 1.57 | 0.33 | 0.005 | 0.009 |
| 29 | " | " | " | " | 0.4 | 1.66 | 0.19 | 0.001 | 0.006 |
| 30 | " | " | " | " | 0.3 | 1.63 | 0.12 | 0.002 | 0.008 |
| 31 | 1 | " | " | " | 0.4 | 1.60 | 0.22 | 0.001 | 0.005 |
| 32 | 0.75 | 2.0 | " | " | " | 1.75 | 0.21 | 0.002 | 0.006 |
| 33* | 1.5 | 1.5 | Chromium steel | " | " | 1.64 | 0.25 | 0.057 | 0.023 |
| 34* | " | " | Alumina | " | " | 1.66 | 0.24 | 0.283 | 0.025 |
| 35 | " | " | Zirconia | Titania | " | 1.58 | 0.23 | 0.002 | 0.035 |
| 36 | " | " | " | Zircon | " | 1.60 | 0.19 | 0.002 | 0.016 |
| 37* | " | " | " | Alumina | " | 1.62 | 0.21 | 0.009 | 0.659 |

*Comparative example liquid may be other liquids such as ethanol, trichloroethane, etc. in addition to water. Various dispersing agents can be used depending on kinds of liquid and ceramic powder. In the above Examples, flowing tube type media agitating mill was used for milling, but other types, such as column type, agitation tank type, annular type, etc. may also be used.

According to the mill comprised of an agitator made of mainly zirconia and grinding media mainly composed of zirconia, zircon or titania, wear of grinding media and agitator is reduced, whereby incorporation of impurities into raw material powder can be reduced. The components incorporated due to wear are mainly zirconia and titania and hence, in case of mixing or milling of ceramic powder containing titanium or zirconium element, influence of change in composition caused by the incorporation can be ignored as compared with when

EXAMPLE 4

The slurry No. 29 of Example 1 was dried and charged in a crucible made of alumina ceramics and calcined at 850° C. for 2 hours to obtain a ceramic powder of nearly a single phase of perovskite type structure. This was granulated by an agitating grinder. This powder and pure water in an amount of 0.75-8 times the net-volume of powder and a poly-carboxylic acid type dispersant (Ceramo D134 of Daiichi Seiyaku Kogyo K.K.) in an amount of 0-2 wt % of the ceramic powder (in terms of solid content) were put in a ball mill and preliminarily milled for one hour. Then, 60 ml of this slurry (mean particle diameter of powder:about 1 μm) was charged in the same media agitating mill as in Example 1 and milled for 30 minutes. Then, in the same manner as in Example 1, sedimentation volume, mean particle diameter and wear amounts of grinding media were measured. The results are shown in Table 4.

TABLE 4

| No. | Amount of water (time) | Amount of dispersing agent (%) | Material of agitator | Material of grinding media | Diameter of grinding media (mm) | Sedimentation volume (cc/cc) | Diameter of particle (μm) | Wear amount (wt %) Agitator | Grinding media |
|---|---|---|---|---|---|---|---|---|---|
| 38* | 8 | no | Zirconia | Zirconia | 0.6 | 2.88 | 0.25 | 0.010 | 0.021 |
| 39* | 4 | " | " | " | " | No flowability | | | |

TABLE 4-continued

| No. | Amount of water (time) | Amount of dispersing agent (%) | Material of agitator | Material of grinding media | Diameter of grinding media (mm) | Sedimentation volume (cc/cc) | Diameter of particle (μm) | Wear amount (wt %) Agitator | Grinding media |
|---|---|---|---|---|---|---|---|---|---|
| 40 | " | 1.0 | " | " | " | 1.72 | 0.23 | 0.004 | 0.018 |
| 41 | 2 | 1.5 | " | " | " | 1.64 | 0.22 | 0.001 | 0.015 |
| 42* | 1.5 | " | " | " | 2 | 1.65 | 0.57 | 0.053 | 0.426 |
| 43 | " | " | " | " | 1 | 1.68 | 0.30 | 0.003 | 0.011 |
| 44 | " | " | " | " | 0.4 | 1.68 | 0.17 | 0.000 | 0.005 |
| 45 | " | " | " | " | 0.3 | 1.72 | 0.11 | 0.002 | 0.008 |
| 46 | 1 | " | " | " | 0.6 | 1.69 | 0.21 | 0.001 | 0.006 |
| 47 | 0.75 | 2.0 | " | " | 0.6 | 1.74 | 0.22 | 0.001 | 0.008 |
| 48* | 1.5 | 1.5 | Chromium steel | " | 0.4 | 1.66 | 0.18 | 0.065 | 0.021 |
| 49* | " | " | Alumina | " | " | 1.65 | 0.17 | 0.215 | 0.020 |
| 50 | " | " | Zirconia | Titania | " | 1.69 | 0.19 | 0.002 | 0.044 |
| 51 | " | " | " | Zircon | " | 1.71 | 0.18 | 0.002 | 0.021 |
| 52* | " | " | " | Alumina | " | 1.64 | 0.17 | 0.015 | 0.592 |

*Comparative example

As is clear from the above Examples, agitator made of zirconia ceramics was less in wear and those made of alumina or chromium steel were considerably worn. The whole of agitator is not necessabily made of mainly zirconia, but only the portion which grinding media and ceramic powder to be milled contact may be made of mainly zirconia. Grinding media made of zirconia, titania or zircon were less in wear amount and grinding media of alumina was heavily worn. Grinding media of steel or glass were also great in wear and are not suitable for mixing or milling of powders such as those for electronic parts which should not contain impurities. Milling chamber is preferably made of resin or zirconia ceramics for inhibiting incorporation of impurities.

Furthermore, according to the mill where peripheral speed of the agitator of the present invention was 10 m/s or higher, diameter of grinding media was 1 mm or less and packing fraction was 65-85 vol % and method for milling ceramic powder using this mill, milling speed is high and the ceramic powder can be milled to fine powder in a short time and besides wear of the grinding media is very small.

EXAMPLE 5

Powders of the same composition as in Example 1 were weighed and 0.5 l of a slurry comprising these ceramic powders, pure water in an amount of 1.7 times the net-volume of these ceramic powders, and a polycarboxylic type dispersing agent (Seramo D134 of Daiichi Kogyo Seiyaku K.K.) in an amount of 1 wt % (Solid content) of the weight of the ceramic powders was put in a media agitating mill of 600 ml in inner volume (Dyno-Mil of Willy A. Bachofen AG Maschinenfabrik; lining of agitating chamber: polyethylene; peripheral speed of agitator: 6.7-20 m/sec; and packing fraction of grinding media: 60-87%) and was subjected to preferential grinding for 1.5 hour. The slurry was circulated by a tube pump. The agitator was made of zirconia ceramics (partially stabilized zirconia containing yttria). The grinding media were made of zirconia ceramics (partially stabilized zirconia containing yttria), titania ceramics and zircon.

Mean particle diameter was measured by taking slurry at interval of a certain time during prefrential grinding. From the data obtained, time required for making the powders to those of 0.2 μm was obtained. The time in the table is shown by means residence time of the slurry in the agitating chamber. Wear amount of grinding media was obtained from change in weight before and after use and is shown by time before particle diameter of powder reached 0.2 μm in the table.

In Table 5, the mark "#" in the column of diameter of grinding media indicates titania grinding media, "&" indicates zircon grinding media and no mark means zirconia grinding media.

TABLE 5

| No. | Peripheral speed of agitator (m/s) | Packing fraction of grinding media (%) | Diameter of grinding media (mm) | Time required for obtaining particle of 0.2 μm (min) | Wear amount of grinding media (wt. %) |
|---|---|---|---|---|---|
| 53* | 6.7 | 76 | 0.4 | 41 | 0.061 |
| 54 | 10 | " | " | 20 | 0.029 |
| 55* | 15 | 60 | " | 45 | 0.073 |
| 56 | " | 65 | " | 19 | 0.025 |
| 57 | " | 70 | " | 10 | 0.011 |
| 58 | " | 76 | " | 6.5 | 0.004 |
| 59 | " | 80 | " | 5.4 | 0.006 |
| 60 | " | 85 | " | 4.6 | 0.019 |
| 61* | " | 87 | " | 3.9 | 0.063 |
| 62 | 20 | 76 | " | 4.3 | 0.003 |
| 63* | 15 | " | 1.2 | 28 | 0.048 |
| 64 | " | " | 1.0 | 19 | 0.023 |
| 65 | " | " | 0.6 | 11 | 0.009 |
| 66 | " | " | # 0.5 | 5.0 | 0.026 |
| 67 | " | " | & 0.6 | 9.4 | 0.021 |

*Comparative example

EXAMPLE 6

The slurry No. 58 of Example 5 was dried and charged in a crucible made of alumina ceramics and calcined at 850° C. for 2 hours to obtain a ceramic powder of nearly a single phase of perovskite type structure. This was granulated by an agitating grinder. 500 ml of a slurry comprising this powder, pure water in an amount of 1.7 times the net-volume of powder and a polycarboxylic acid type dispersant (Ceramo D134 of Daiichi Seiyaku Kogyo Seiyaku K.K.) in an amount of 1 wt % of the ceramic powder (in terms of solid content) was put in a media agitating mill used in Example 5 and milled. Then, milling time and wear amount of grinding media were measured in the same manner as in Example 1. The results are shown in Table 6.

TABLE 6

| No. | Peripheral speed of agitator (m/s) | Packing fraction of grinding media (%) | Diameter of grinding media (mm) | Time required for obtaining particle of 0.2 μm (min) | Wear amount of grinding media (wt. %) |
|---|---|---|---|---|---|
| 68* | 6.7 | 76 | 0.4 | 36 | 0.055 |
| 69 | 10 | " | " | 15 | 0.022 |
| 70* | 15 | 60 | " | 40 | 0.066 |
| 71 | " | 65 | " | 22 | 0.032 |
| 72 | " | 70 | " | 8.1 | 0.011 |
| 73 | " | 76 | " | 7.6 | 0.008 |
| 74 | " | 80 | " | 5.1 | 0.015 |
| 75 | " | 85 | " | 4.2 | 0.023 |
| 76* | " | 87 | " | 3.6 | 0.069 |
| 77 | 20 | 76 | " | 5.2 | 0.005 |
| 78* | 15 | " | 1.2 | 32 | 0.063 |
| 79 | " | " | 1.0 | 18 | 0.021 |
| 80 | " | " | 0.6 | 12 | 0.013 |
| 81 | " | " | # 0.4 | 6.5 | 0.025 |
| 82 | " | " | & 0.6 | 9.6 | 0.026 |

*Comparative example

In Table 6, the mark "#" indicates titania grinding media, the mark "&" indicates zircon grinding media and no mark means zirconia grinding media in the column of diameter of grinding media.

As is clear from the above Example, according to the mill and the milling method of the present invention where peripheral speed of the agitator was 10 m/s or higher, diameter of grinding media was 1 mm or less and packing fraction of grinding media was 65–85 vol %, milling speed was high and the ceramic powder could be milled to fine powder in a short time and besides wear of the grinding media was very small. When packing fraction was 70–80%, the wear amount of grinding media was especially small. If peripheral speed of agitator was less than 10 m/s, milling speed was low and wear amount of grinding media was great. If packing fraction was less than 65%, milling speed was low and wear amount of grinding media was great and if more than 85%, milling speed was high and packing fraction of grinding media was much increased.

Furthermore, according to the present invention, by constructing at least inner face of milling chamber of the media agitating mill with a composite of powder of at least one of ceramics and metal and an organic polymer material, both the characteristics of ceramics or metal and organic polymer material can be provided. That is, incorporation of metallic components caused by wearing can be reduced and heat conductivity is high and hence heat dissipation can be increased. Therefore, according to the mill of the present invention, milling time can be increased and ceramic powder can be milled to fine powder in a very short time.

EXAMPLE 7

40–80 ml of the slurry of the same composition as in Example 5 after preliminary mixing was put in a media agitating mill of 40–50 ml in inner volume [M50 mortar mill of Eiger Engineering Limited; material of inner face of milling chamber: a composite of hard chromium plating, polyurethane, polyethylene, epoxy resin, and powder of metallic Al and epoxy resin (1:1, particle diameter of Al: 0.2–0.5 mm) and a composite of SiC ceramic powder and polyurethane resin (1:1, particle diameter of SiC: 0.2–0.5 mm); peripheral speed of agitator: 10 m/sec; packing fraction: 80%] and was subjected to preferential grinding for 20 minutes. The agitator was made of zirconia ceramics (partially stabilized zirconia containing yttria). The grinding media were made of zirconia ceramics (partially stabilized zirconia containing yttria), titania ceramics and zircon.

Mean particle diameter was measured by taking slurry at interval of a certain time during preferential grinding. From the data obtained, time required for making the powders to those of 0.2 μm was obtained. The time in the table is shown by mean residence time of the slurry in the agitating chamber. Wear amount of grinding media was obtained from change in weight before and after use and is shown by time before particle diameter of powder reached 0.2 μm in the table.

In Table 7, the mark "#" in the column of diameter of grinding media indicates titania grinding media, "&" indicates zircon grinding media and no mark means zirconia grinding media.

TABLE 7

| No. | Material of agitator | Diameter of grinding media (mm) | Time required for milling to powder of 0.2 μm (min) | Wear amount of grinding media (wt. %) |
|---|---|---|---|---|
| 83* | Chromium plating | 0.4 | 3.2 | 0.051 |
| 84* | Polyurethane | " | Continuous operation was impossible. | — |
| 85* | Polyethylene | " | Continuous operation was impossible. | — |
| 86* | Epoxy | " | Continuous operation was impossible. | — |
| 87 | Epoxy + Al | " | 2.9 | 0.009 |
| 88 | Urethane + SiC | " | 3.0 | 0.008 |
| 89* | Urethane + SiC | 1.2 | 8.5 | 0.125 |
| 90 | Urethane + SiC | 1.0 | 4.8 | 0.033 |
| 91 | Ure- | 0.6 | 3.6 | 0.015 |

TABLE 7-continued

| No. | Material of agitator | Diameter of grinding media (mm) | Time required for milling to powder of 0.2 μm (min) | Wear amount of grinding media (wt. %) |
|---|---|---|---|---|
| | thane + SiC | | | |
| 92 | Urethane + SiC | # 0.6 | 4.1 | 0.035 |
| 93 | Urethane + SiC | & 0.5 | 3.5 | 0.019 |

*Comparative example

EXAMPLE 8

The slurry No. 88 of Example 7 was dried and charged in a crucible made of alumina ceramics and calcined at 850° C. for 2 hours to obtain a ceramic powder of nearly a single phase of perovskite type structure. This was granulated by an agitating grinder. This powder and pure water in an amount of 1.7 times the net-volume of powder and a poly-carboxylic acid type dispersant (Ceramo D134 of Daiichi Seiyaku Kogyo K.K.) in an amount of 1 wt % of the ceramic powder (in terms of solid content) were put in a ball mill and preliminarily milled (mean particle diameter: 1.1 μm). 40–80 ml of this slurry was charged in the same media agitating mill as in Example 7 and milled for 20 minutes. Then, in the same manner as in Example 7, milling time and wear amount of grinding media were measured. The results are shown in Table 8.

In Table 8, the mark "#" indicates titania grinding media, the mark "&" indicates zircon grinding media and no mark means zirconia grinding media in the column of diameter of grinding media.

TABLE 8

| No. | Material of agitator | Diameter of grinding media (mm) | Time required for milling to powder of 0.2 μm (min) | Wear amount of grinding media (wt. %) |
|---|---|---|---|---|
| 94* | Chromium plating | 0.4 | 3.0 | 0.062 |
| 95* | Polyurethane | " | Continuous operation was impossible. | — |
| 96* | Polyethylene | " | Continuous operation was impossible. | — |
| 97* | Epoxy | " | Continuous operation was impossible. | — |
| 98 | Epoxy + Al | " | 2.5 | 0.007 |
| 99 | Urethane + SiC | " | 2.8 | 0.007 |
| 100* | Urethane + SiC | 1.2 | 12.2 | 0.103 |
| 101 | Urethane + SiC | 1.0 | 5.2 | 0.024 |
| 102 | Urethane + SiC | 0.6 | 3.3 | 0.011 |
| 103 | Urethane + SiC | # 0.6 | 4.4 | 0.037 |
| 104 | Urethane + SiC | & 0.5 | 3.2 | 0.012 |

*Comparative example

As is clear from the above Example, according to the media agitating mill and milling method of the present invention where inner face of milling chamber was constructed of a composite prepared by dispersing powder of Al metal or SiC ceramics in organic polymer material such as polyurethane or epoxy resin, wear amount of grinding media was conspicuously decreased and besides slurry did not abnormally generate heat because of excellent heat dissipation of milling chamber and milling was able to be carried out for a long time. Furthermore, according to the mill where diameter of grinding media was 1 mm or less, milling speed was high and the powder was able to be milled to fine powder in a short time and wear of grinding media was very small. In case of the milling chamber made of hard chromium plating, heat dissipation during milling was good and continuous use of 20 minutes was possible, but wear of grinding media was much. Milling chamber was also considerably worn. On the other hand, in case of the inner face of milling chamber was made of only organic polymer materials of polyurethane, polyethylene and epoxy resin, heat dissipation during milling was very inferior and slurry abnormally generated heat and slurry temperature exceeded 80° C. after operation for about 5 minutes and thus continuous use was impossible.

The scope of the present invention is not limited to the above Examples and other metal powders, ceramics powders and organic polymer materials which constitute the composites can be used depending on the kinds of powders to be milled. The shape of the powders may be particulate, plate-like, needle-like, fibrous, etc.

Furthermore, the fine powder of the present invention is characterized in that mean particle diameter is 0.6 μm or less, it has a suitable particle size distribution and dispersibility is good. Molded body made from this fine powder is high in density and superior in sinterability. Further, the method for producing fine powder by the media agitating mill according to the present invention is a method for producing the fine powder having the above characteristics and can produce fine powder having the above particle size distribution in a very short time. Moreover, according to the method for producing the sintered body of the present invention, a sintered body of high density can be produced by dispersing the fine powder obtained by the above method in a milling medium liquid, if necessary, in which binder and plasticizer are homogeneously incorporated, then wet-molding the dispersion by doctor blade method or the like and thereafter firing the molded body.

EXAMPLE 9

$Pb(Zn_{1/3}Nb_{2/3})O_3$-$Pb(Sn_{1/3}Nb_{2/3})O_3$-$PbTiO_3$-$PbZrO_3$ type piezoelectric ceramics calcined powder (powder obtained by calcining the ceramic powder at 850° C. for 2 hours to make a single phase of nearly perovskite type structure and then allowing the powder to pass a screen of 0.5 mm) was preliminarily mixed with a milling medium liquid (butyl acetate) in an amount of 297 vol % of the net-volume of this powder and a dispersing agent (Span 85) in an amount of 3 vol % of this powder by a mixer and then, 80 cc of this slurry was charged in a media agitating mill of 50 cc in inner volume (M50 mortar mill of Eiger Engineering Limited; peripheral speed of agiator: 10 m/sec and packing fraction of grinding media: 70%) and milled therein. The agitator was made of zirconia ceramics (partially stabilized zirconia containing yttria). The grinding media used were made of zirconia ceramics of 0.4 mm in diameter (partially stabilized zirconia containing yttria). The milling time in the table is shown by mean residence time of slurry in the milling chamber. Particle size distribution in the table is shown by weight % of particles having a diameter of twice or more the mean particle diameter. To this milled slurry were added polyvinyl butyral as a binder in an amount of 45% by volume of the powder and dibutyl phthalate as a plasticizer in an amount of 36% by volume of the powder and these were well mixed and the mixture was molded into a sheet by doctor blade method. The molded body was dried and then heated to 500° C. to remove organic materials. This sample was measured on molding density. In the table, this is shown by ratio (%) to true density of the powder. Then, this molded body was fired at 1140° C. for 2 hours. Firing density was measured by a buoyancy method.

TABLE 9

| No. | Milling time (min) | Mean particle diameter (μm) | Particle size distribution (wt. %) | Molding density (%) | Firing density (g/cm$^3$) |
|---|---|---|---|---|---|
| 105* | 1 | 1.16 | 2 | 52.3 | 7.27 |
| 106* | 2 | 0.74 | 5 | 55.8 | 7.40 |
| 107 | 2.5 | 0.60 | 7 | 60.2 | 7.99 |
| 108 | 3 | 0.42 | 8 | 62.2 | 8.00 |
| 109 | 5 | 0.33 | 12 | 63.8 | 8.01 |
| 110 | 10 | 0.202 | 13 | 64.5 | 8.02 |
| 111 | 30 | 0.105 | 10 | 62.3 | 8.01 |

*Comparative example

As is clear from Table 9, the fine powder of the present invention, namely, which had a mean particle diameter of 0.6 μm or less and had a particle size distribution of 7 wt % or more when this is shown by a ratio of powder of twice or more the mean particle diameter showed high molding density and high firing density. Although the powders of Comparative example Nos. 105 and 106 can be further increased in their firing density if they are fired at a high temperature of 1280° C. or higher, it is at most 7.8 kg/cm$^3$.

According to the method for producing fine powder by the media agitating mill of the present invention, fine powder of 0.6 μm or less in mean particle diameter is obtained in a very short time by employing grinding media of 0.4 mm in diameter and the milling medium liquid which is the same as the solvent used in wet-molding of powder. In order to produce these fine powders by conventional ball mill, several ten hours several hundreds hours is required. According to the method for producing fine powder of the present invention, wet-molding can be carried out in the state of keeping the dispersion of the powder optimum by employing a milling medium liquid which is the same as the medium liquid in the molding and hence molding density is improved and sintered body of high density can be obtained as shown in Table 9. The powder shows good dispersibility when volume of the milling medium liquid is 4 times or less the net-volume of the powder and a dispersing agent is added. The dispersibility of the powder is evaluated by sedimentation volume of the powder. When a milling medium liquid which is different from the medium liquid used in molding is used, drying must be carried out once after milling. Since fine powder has strong tendency to agglomerate upon drying, re-dispersion becomes difficult and molded body of high density cannot be obtained. The method for producing a sintered body of the present invention is characterized in that production of fine powder and molding of the fine powder are carried out by dispersing in the same liquid.

The scope of the present invention is not limited to the above Examples. In the above Examples, materials of powder were ceramics, especially, piezoelectric ceramics, but powders of other materials such as dielectric materials, substrate materials, metallic materials, etc. can be used. Further, the milling medium liquid may be other organic materials such as ethanol, trichloroethane, etc. in addition to butyl acetate and medium liquids of good dispersibility can be used depending on material of powder, etc.

Moreover, in the Examples, doctor blade method was employed for wet-molding of fine powder, but other wet-molding methods such as casting molding, centrifugal molding, filter press molding, etc. can be used to obtain similar effects.

What is claimed is:

1. A fine lead oxide based piezoelectric ceramic powder which has a mean particle diameter of 0.6 μm or less and a particle size distribution of 7% by weight or more as a proportion of particles having a diameter twice or more the mean particle diameter.

2. A fine lead oxide based piezoelectric ceramic powder which has a mean particle diameter of 0.2 μm or less and a particle size distribution of 7% by weight or more as a porportion of particles having a diameter twice or more the mean particle diameter.

3. A fine powder according to claim 1, wherein the material of the powder is a piezoelectric ceramic of $Pb(Zn_{1/3}Nb_{2/3})O_3$-$Pb(Sn_{1/3}Nb_{2/3})O_3$-$PbTiO_3$-$PbZrO_3$ system.

* * * * *